United States Patent
Gauthier, Jr. et al.

(10) Patent No.: US 6,841,766 B2
(45) Date of Patent: Jan. 11, 2005

(54) APPARATUS AND METHOD FOR DETECTING THE LOCATION, INTENSITY AND INITIATION TIME OF AN ENERGY PULSE

(75) Inventors: Leo R. Gauthier, Jr., Timonium, MD (US); John M. Klimek, Catonsville, MD (US); Angela L. Wesner-Barrios, Hanover, MD (US)

(73) Assignee: The Johns Hopkins University, Baltimore, MD (US)

( * ) Notice: Subject to any disclaimer, the term of this patent is extended or adjusted under 35 U.S.C. 154(b) by 325 days.

(21) Appl. No.: 10/110,651
(22) PCT Filed: Oct. 9, 2001
(86) PCT No.: PCT/US01/31540
§ 371 (c)(1),
(2), (4) Date: Apr. 16, 2002
(87) PCT Pub. No.: WO02/31451
PCT Pub. Date: Apr. 18, 2002

(65) Prior Publication Data
US 2002/0179818 A1 Dec. 5, 2002

Related U.S. Application Data

(60) Provisional application No. 60/238,981, filed on Oct. 10, 2000, and provisional application No. 60/244,094, filed on Oct. 27, 2000.

(51) Int. Cl.$^7$ .............................................. H01J 40/14
(52) U.S. Cl. ...................................................... 250/206
(58) Field of Search ................................ 250/206, 221, 250/227.11, 203.1, 203.3, 203.6; 356/141.5

(56) References Cited

U.S. PATENT DOCUMENTS

| | | | |
|---|---|---|---|
| 3,937,951 A | 2/1976 | Krider | 250/209 |
| 3,953,137 A | 4/1976 | Balut et al. | 356/222 |
| 4,044,258 A | 8/1977 | Frungel | 250/336 |
| 4,553,031 A | 11/1985 | Cholin et al. | 250/339 |
| 4,825,063 A | 4/1989 | Halldorsson et al. | 250/203 |
| 4,965,453 A | 10/1990 | Hoschette et al. | 250/349 |
| 5,057,833 A | 10/1991 | Carlson | 340/961 |
| 5,771,020 A | 6/1998 | Markson et al. | 342/460 |
| 5,784,156 A | 7/1998 | Nicholson | 356/141.5 |
| 5,811,809 A | 9/1998 | Smith et al. | 250/336.1 |
| 6,034,365 A | 3/2000 | Levin | 250/206.2 |
| 6,163,372 A * | 12/2000 | Sallee et al. | 356/5.1 |
| 6,392,747 B1 * | 5/2002 | Allen et al. | 356/141.1 |

* cited by examiner

*Primary Examiner*—Thanh X Luu
(74) *Attorney, Agent, or Firm*—Albert J. Fasulo, II

(57) ABSTRACT

A plurality of energy couplers (12) receives signals from an energy pulse, each of the energy couplers (12) having a defined field of view, the field of views of at least some of the energy couplers being overlapping. A transducer (14) converts the signals received from the energy pulse to voltage or current output signals that are then amplified. A threshold circuit (18) triggers when the amplitude of a signal caused by the energy pulse exceeds a predetermined level, and signal processing instrumentation (24) then calculates the source location and/or the intensity and/or the initiation time of the energy pulse based on the timing of the output signals associated with individual energy couplers (12).

9 Claims, 9 Drawing Sheets

APPARATUS AND METHOD FOR DETECTING THE LOCATION, INTENSITY AND INITIATION TIME OF AN ENERGY PULSE

CROSS REFERENCE TO RELATED APPLICATION

This application claims priority of U.S. Provisional Applications 60/238,981 filed on Oct. 10, 2000, and No. 60/244,094 filed on Oct. 27, 2000.

STATEMENT OF GOVERNMENTAL INTEREST

This invention was made with U.S. Government support under Contract No. N00024-98-D-8124, awarded by the Department of the Navy. The U.S. Government has certain rights in this invention.

FIELD OF THE INVENTION

The present invention relates to a method and apparatus for detecting the location, intensity, and initiation time of a localized rapid increase of radiant energy.

BACKGROUND OF THE INVENTION

Detection systems that can infer information about the location, intensity, and initiation time of energy pulses have several uses. Applications of such systems include identifying the positions of pulsed radar sources, hostile gunfire sources, explosions and lightning. While there are many existing systems capable of resolving the location of optical or other energy signals, they are limited by their costs, response times and operational environmental constraints. There is therefore a need for improved systems that are less expensive, faster, and more durable.

SUMMARY OF THE INVENTION

The present invention is an apparatus and method for detecting the location, intensity, and initiation time of an energy pulse that overcomes some of the disadvantages of the prior art.

An object of the present invention is to provide a system including relatively inexpensive off the shelf components (COTS) to detect the location, intensity, and initiation time of an energy pulse.

Another object of the present invention is to detect the location, intensity, and initiation time of an energy pulse very rapidly.

Another object of the present invention is to provide an energy pulse detection system that is durable and capable of functioning in severe environments.

These and other objects of the present invention are achieved in an apparatus that includes the following: a plurality of energy couplers for receiving a signal from an energy pulse, each of the energy couplers having a defined field of view, the field of views of at least some of the energy couplers being overlapping; a transducer operatively connected to the energy couplers for converting a signal received from the energy pulse to a voltage or current output signal; an amplifier operatively connected to the transducer for amplifying the output signal from the transducer; a threshold circuit operatively connected to the amplifier for outputting a signal when the amplitude of the output signal from the transducer exceeds a predetermined level; and signal processing instrumentation, operatively connected to the threshold circuit, for calculating the source location and/or the intensity of the energy pulse.

Other objects and advantages of the invention will become more fully apparent from the following more detailed description and the appended drawings that illustrate several embodiments of the invention. In the following description, all like reference numerals refer to like elements.

DETAILED DESCRIPTION OF THE INVENTION

Figure 1:
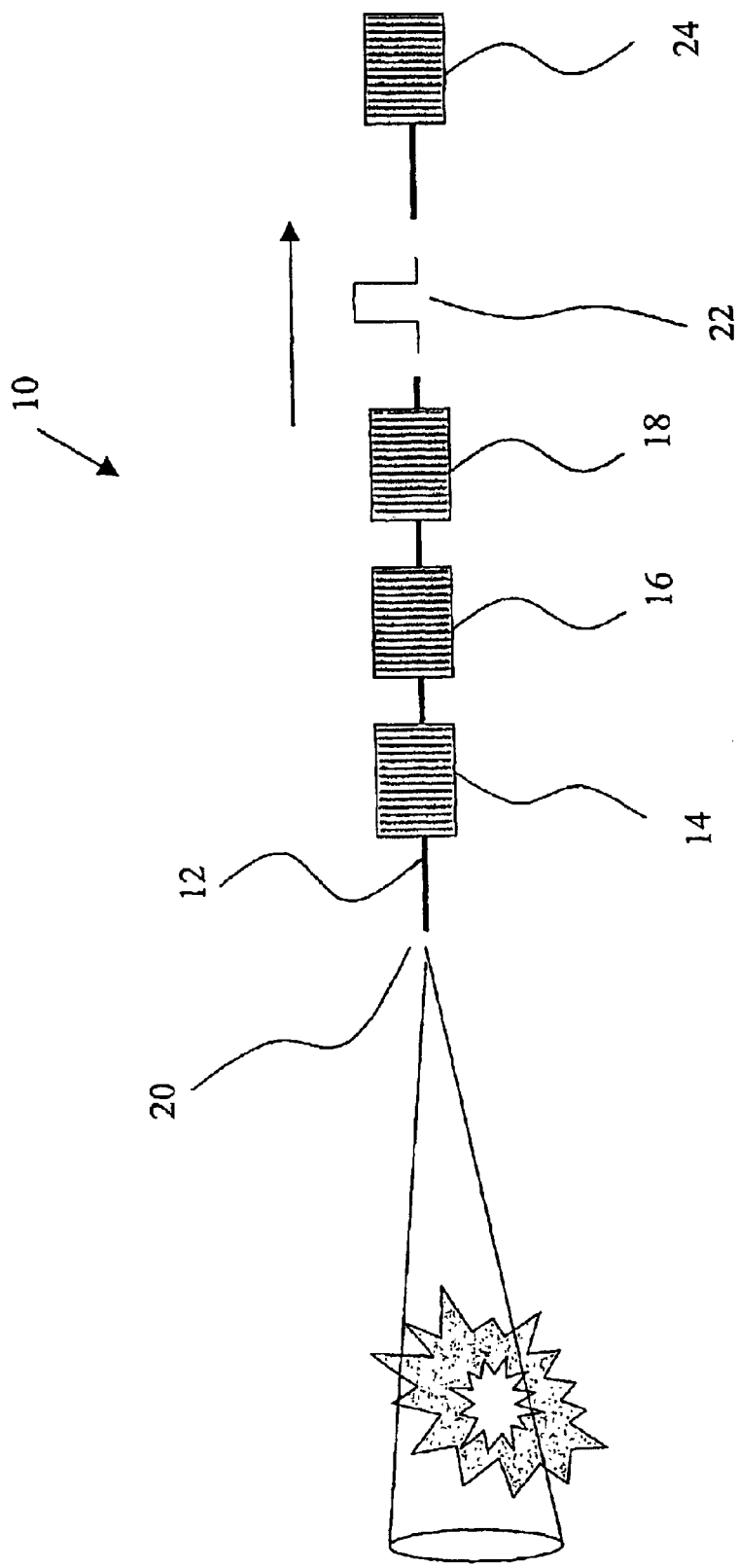
FIG. 1 is a schematic diagram of the basic components of a detector according to the present invention.

The hardware used to detect an energy pulse according to the present invention may include very simple and inexpensive components. For example, FIG. 1 is a schematic diagram of the basic components that may be used in a detector 10 to detect an energy pulse. The components include an energy coupler 12, a transducer 14, an amplifier 16, and a threshold circuit 18. In the example shown in FIG. 1, the pulsed energy signal is an optical signal and the energy coupler 12 is an optical fiber that collects light from the field-of-view (FOV) of the distal end 20 of the fiber. After traveling down the optical fiber, the light is incident on the transducer 14, in this case a photodiode, and generates a current. This current is converted to a voltage, amplified and coupled to the threshold circuit 18. When the voltage received by the threshold circuit 18 exceeds a pre-set threshold, a digital signal 22 is output from the detector 10.

Signal processing instrumentation 24 then employs the time when the digital signal was triggered to calculate information about the location, intensity, and initiation time of the energy pulse.

A detector 10 may be designed to detect various forms of energy including any electromagnetic (EM) energy such as light or radio-frequency (RF) energy, and also sound. The basic function of the detector 10 as shown in FIG. 1 is the same regardless of the form of energy being detected. For example, if sound energy is being detected, then the energy coupler 12 could be a sound tube and the transducer 14 could be a microphone. When detecting bursts of RF energy, the energy coupler 12 and transducer 14 could be combined in a directional antenna.

Figure 2:
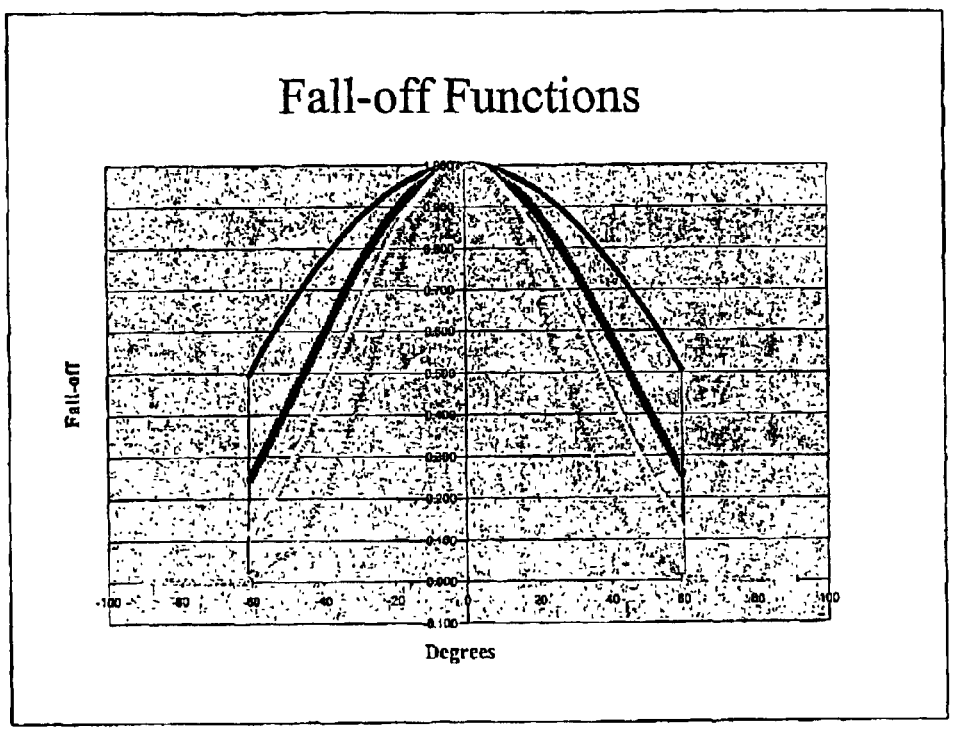
FIG. 2 is a graph illustrating the fall-off functions of various detectors according to the present invention approximated by cosine to the nth power.
Figure 3:
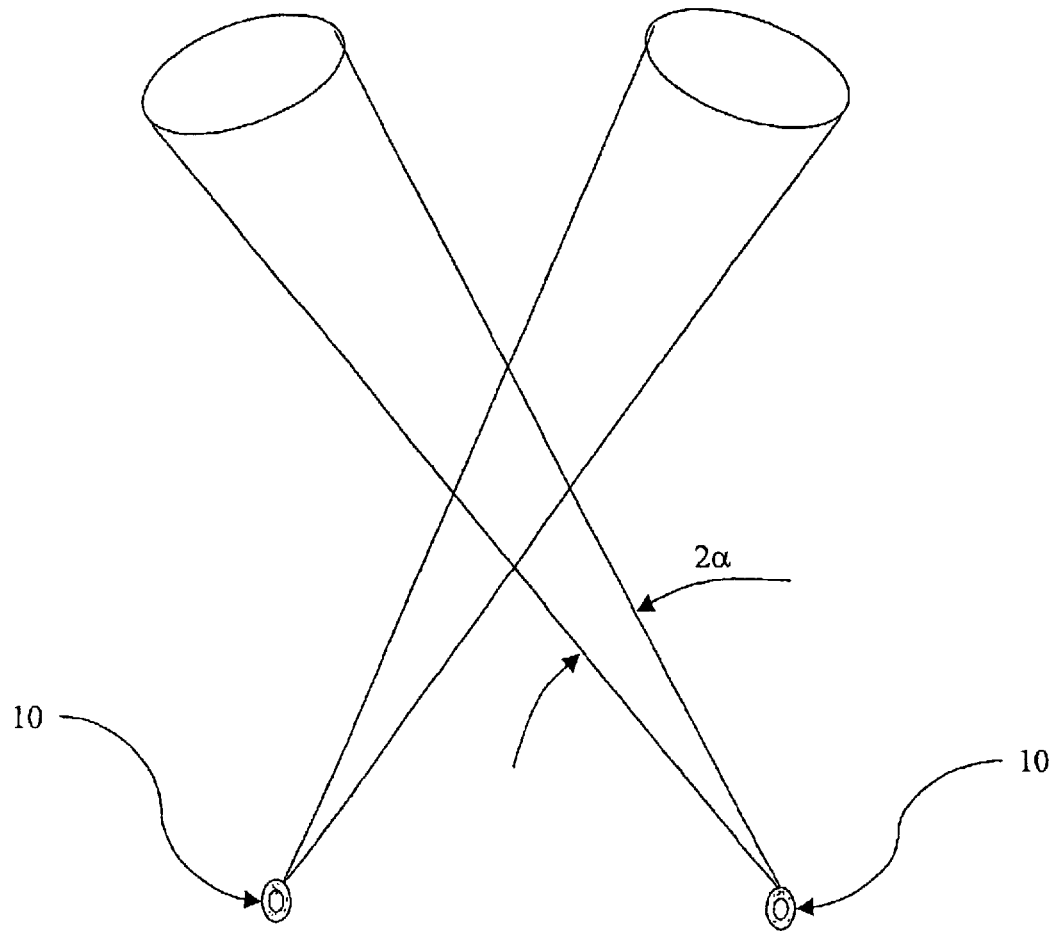
FIG. 3 is a schematic diagram illustrating the angular detection region, or fields of view (FOV), of two detectors according to the present invention.

Another feature of the present invention is the fact that the distal end 20 of the energy coupler 12 is directional. As described below in reference to FIG. 2, that means that the energy collecting efficiency of the energy coupler 12 changes and usually decreases as the energy source moves off the axis of the energy coupler 12. If the energy collecting efficiency of a detector 10 drops below a useful value at some angle a (defined as the angular cutoff of the detector 10), a cone-shaped region may define the FOV of that detector 10. FIG. 3 illustrates two overlapping cone-shaped FOVs defined by the angular detection region of two different detectors 10.

The present invention enables a system including an array of detectors 10, each detecting simply a threshold level of energy from a given field of view, as described above, to both locate an energy pulse source in three dimensional (3-D) space and to determine the intensity and the initiation time of the pulse.

Following are three sections providing detailed descriptions of the techniques of the present invention. The first section (A) provides a mathematical model of the detectors 10 according the present invention. The next section (B) describes a graphical solution for determining the location of an energy pulse in space and also illustrates the concept of temporal triangulation. The last section (C) describes an analytical mathematical solution for employing the techniques of the present invention to locate the source and determine the intensity of an energy pulse in 3-D space.

(A) Mathematical Model of Detectors

An energy signal to be detected by the present invention may be modeled as a point source having an intensity that rises linearly in time from t=0 with rate I. Response time, field-of-view (FOV), and gain characterize each detector 10 in the system. The response time or latency function is the total time between the initiation of a pulse of energy from a source and the time at which a detector output signal is generated. The total response time is thus the sum of the time required for a signal to reach a detector 10, plus the time required for the signal to propagate through the detector 10, plus the time required for the signal to reach an intensity that is sufficient to trigger the threshold circuit 18 of the detector 10, plus the time for the detector output signal to be transmitted to the rest of the system.

The circuit delay associated with the detector electronics is very small (on the order of nanoseconds) if designed properly. Therefore the key terms in the latency characteristic of a detector 10 are due to the geometry between the detector 10 and the source. The form of the geometrical latency of a direct current (DC)-coupled detector 10 is shown in equation (1).

$$\tau = S^{-1} I^{-1} \rho^2 F^{-1}(\gamma), \quad (1)$$

where S is a constant term for each detector 10 that is determined by the electronic gain of the amplifier 16, the size of the energy coupler 12, the efficiency of the transducer 14, the threshold for the threshold circuit 18, and some other minor variables. S can therefore be thought of as a composite gain. I is the intensity rate of rise of the energy pulse. The term $\rho$ is the distance from the aperture at the distal end 20 of the energy coupler 12 to the radiant source. The function $F(\gamma)$ describes the way the energy collecting efficiency decreases as the source moves off the optical axis by angle $\gamma$. When using an optical fiber as the energy coupler 12, the off-axis loss of energy coupling is mainly due to the cosine projection of the source and the numerical aperture of the energy coupler 12. For purposes of modeling, the fall-off may be approximated as cosine to the nth power, where n was a variable parameter, as shown in equation (2). FIG. 2 shows the fall-off function for various values of n. Since real energy couplers 12, such as fiber optic cables, seldom see beyond 60° off-axis, the residual tails of the cosine functions are shown clipped at 60°.

$$F(\gamma) = \cos^n(\gamma), \, \gamma < 60° \; F(\gamma) = 0, \text{ otherwise} \quad (2)$$

Equation (1) indicates that the response time is decreased if S or I is increased. This is consistent with expectations, since one would expect the response time to decrease if either the gain or the source intensity rate of rise was increased. Similarly, the response time increases as either $\gamma$ or $\rho$ increases, both changes resulting in less energy at the aperture of the energy coupler 12.

Figure 4:
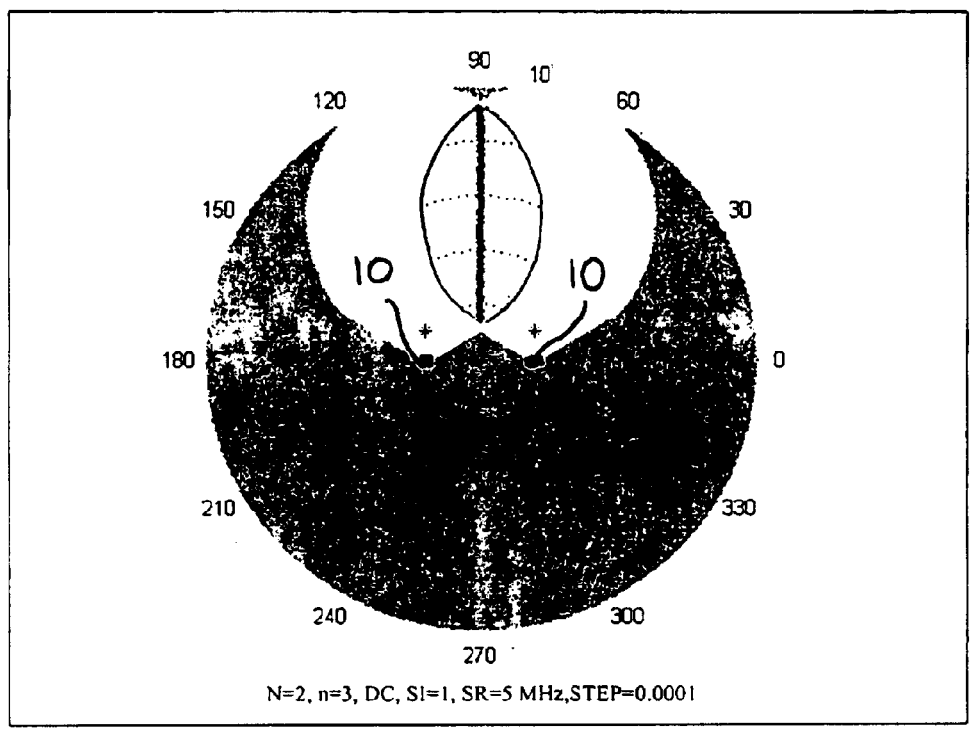
FIG. 4 is a polar diagram showing the overlapping fields of view (FOV) of two detectors according to the present invention, including a simple straight isotime boundary.

Graphical Method for Determining the Location of an Energy Pulse in 2-D Space and an Illustration of the Concept of Temporal Triangulation Equation (1) indicates that if two detectors 10 are used with overlapping FOVs, there is a boundary of equal latency in the region of overlap. Two overlapping FOVs are shown schematically in FIG. 3. A corresponding boundary of equal latency is illustrated in the polar diagram shown in FIG. 4. Each of the polar diagrams shown in FIGS. 4–10 has a group of parameters listed along the bottom. N is the number of detectors 10, n is the fall-off function exponent, DC is the type of coupling (direct current (DC) versus alternating current (AC)), SI is the product of the composite gain and the intensity, SR is the sample rate, and STEP is the step size in the parametric representation of the simulated plane. In FIG. 4, two detectors 10 are located at +/−2, respectively, on the real axis. The asterisks above the detectors 10 indicate their orientation (i.e., the direction in which they are pointing).

The boundary of equal latency is composed of all source locations where both detectors 10 will have equal latency. These boundaries between pairs of detectors 10 are referred to as isotimes. The isotime in FIG. 4 is on the imaginary axis. Isotimes are significant for two reasons. Firstly, the boundary is independent of the intensity of the source I. Secondly, the temporal order of response of the detectors 10 depends on which side of the boundary that the source is on. The independence of isotimes with intensity is evident due to the fact that both detectors 10 are viewing the same source. If the latency, according to equation (I) is equal for two detectors 10, the I term cancels out. For a given detector arrangement, with the intensity rate of rise initially at zero, no isotimes will be detected by the model since FOVs will not overlap. As the rate of rise of source intensity increases, isotimes will appear at FOV overlap boundaries. As intensities continue to increase, the isotimes will grow as regions of overlap expand. Once the intensity rate of rise is great enough to ensure maximal overlap between the FOVs of the detectors 10, then the isotimes detected by the model will not change.

FIG. 4 also illustrates some other effects. Each FOV covers a limited region of space, as discussed above in reference to FIG. 3. Blind regions are apparent for two different reasons. First, the detectors 10 cannot receive light at extreme angles of incidence or from behind the detectors 10. This gives rise to blind regions up close to the detectors 10 at extreme angles, and behind the detectors 10. Secondly, there is a detection boundary, beyond which the energy source is too far away to detect within the time period of a limited detection window. This region is also outside the detection FOV and is defined by the base of the inverted cones shown in FIG. 3. The composite system gain parameter S must be selected to ensure coverage to the required range for an expected energy pulse source distance and intensity.

Figure 5:
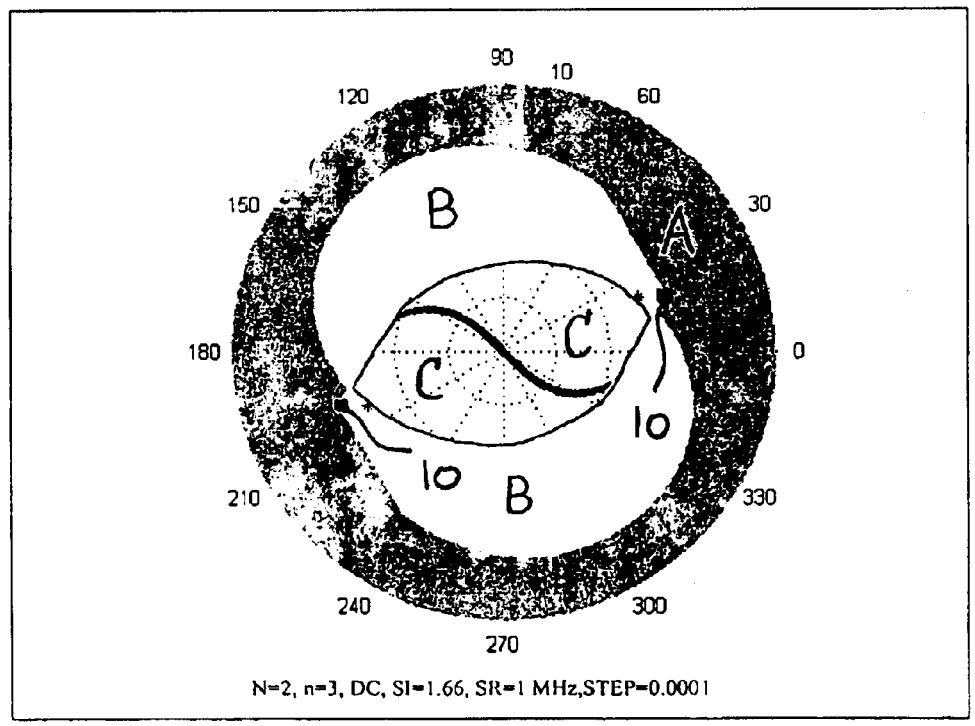
FIG. 5 is a polar diagram showing the overlapping FOV of two detectors according to the present invention having opposing views, including an "S"-shaped isotime.

FIG. 5 illustrates another two-detector arrangement, detectors 10 opposing one another. The isotime is an S shaped boundary in the space between the detectors 10. It is clear in this case how the space is divided. The plane is neatly divided into 3 regions, the region of non-detection (A), the region of detection by only one detector 10 (B), and the region detected by both detectors 10 (C). However, the region of dual detection is further divided by the isotime into two sub regions, one for when the left detector is triggered first, and one for when the right detector is triggered first. This is termed "temporal ordering" of the detectors. This additional narrowing of the region of detection is a first step toward uniquely identifying the location of the energy pulse source through what is termed temporal triangulation. The concept of temporal triangulation is further described as follows.

Referring again to FIG. 5, if an energy pulse is detected by both detectors 10, one can determine on which side of the isotime boundary an energy pulse source must reside simply by knowing a) where the detectors 10 are pointed and b) which detector was triggered first (i.e., which detector received enough radiated energy from the pulse to cause a signal received by the threshold circuit 18 to cross a preset level). However, by adding additional detectors 10 and by including the precise time at which each detector 10 is triggered, one can uniquely identify the location of the energy pulse source. The multi-detector response time measurement is termed a latency vector. When the latency vector is used as the basis for computations, the unique location of an energy pulse source may be determined. This calculation of position based on a measured latency vector from a multi-detector response is termed temporal triangulation.

Temporal triangulation has a distinct advantage over spatial triangulation. Spatial triangulation, such as that used in a traditional Global Positioning System (GPS), requires the points of a triangle (identified by individual satellites in the case of GPS) to be significantly separated in space to provide sufficient accuracy and resolution. For example, GPS calculates the distance between a satellite and a GPS receiver on the earth by multiplying the speed of light by the time required for a signal to travel between the satellite and the receiver. If three satellites in a GPS system are too close together, the distance between each satellite and an earth-based receiver will be nearly equal, resulting in very low spatial resolution for the system. However, temporal triangulation according to the present invention does not require the individual detectors 10 to be far apart in order to obtain good spatial resolution because response times rather than transit times are used. Using temporal triangulation, the detectors 10 must simply have overlapping fields of view and must be oriented in different directions in order to resolve the unique location of an energy pulse source. In a 2-D plane, a minimum of four detectors is required to uniquely determine the position of an energy pulse by performing temporal triangulation from the latency vector. In 3-D space, a minimum of five detectors is required to uniquely identify the position of an energy pulse.

Figure 6:
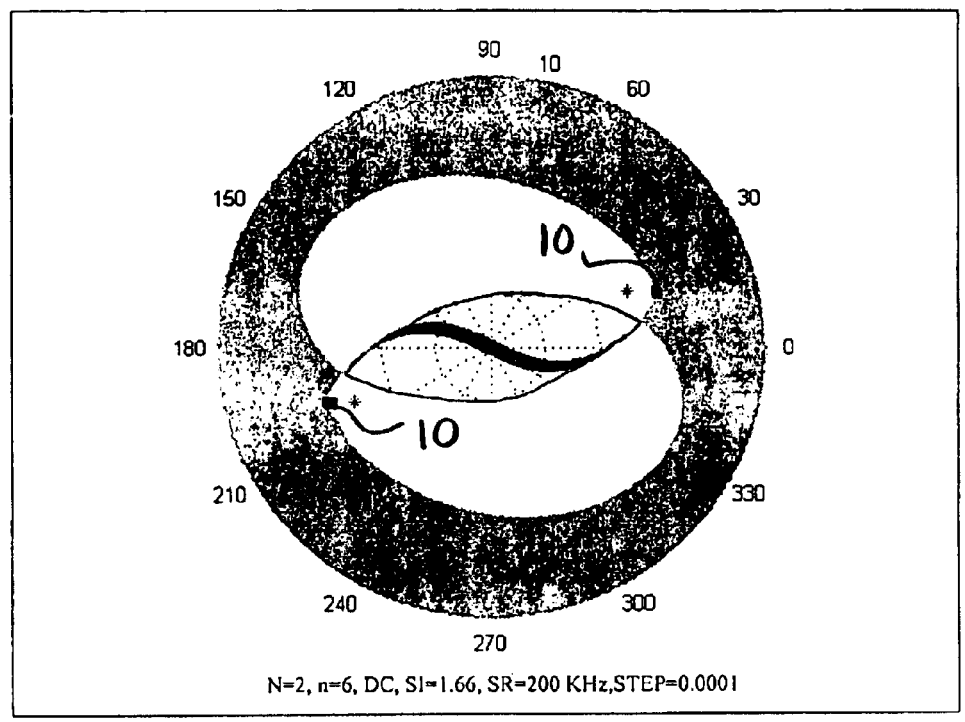
FIG. 6 is a polar diagram showing the overlapping FOV of two detectors according to the present invention having opposing views, showing the effect of increasing fall-off and decreasing sample rate.
Figure 7:
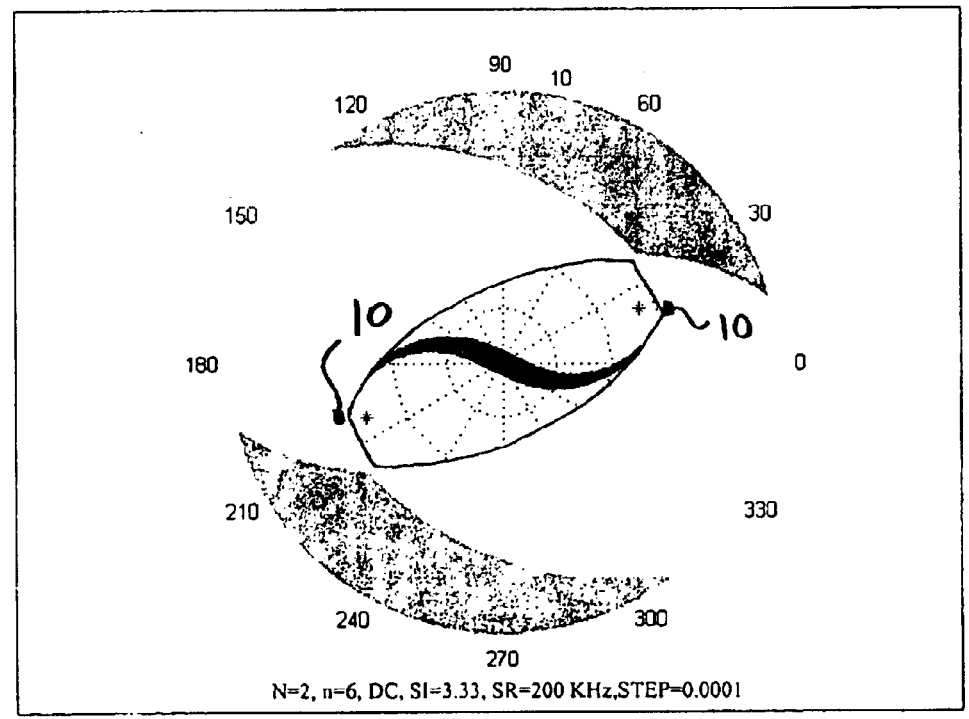
FIG. 7 is a polar diagram showing the overlapping FOV of two detectors according to the present invention having opposing views, showing the effect of increasing source intensity rate of rise.
Figure 8:
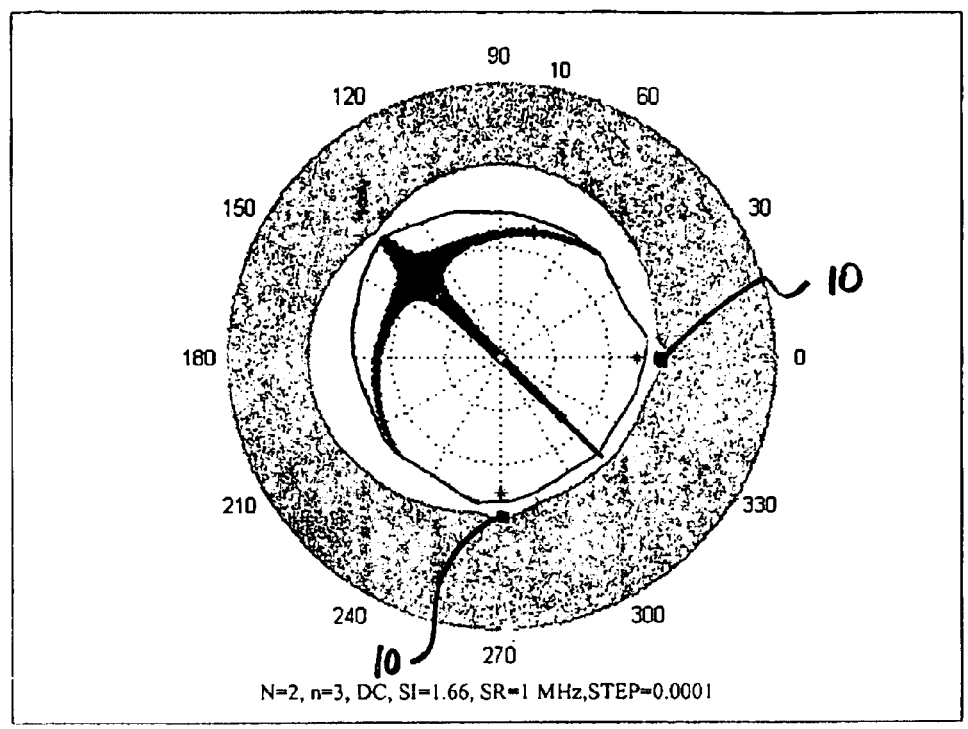
FIG. 8 is a polar diagram showing the overlapping FOV of two detectors according to the present invention having views at 90 degrees to each other, showing an anchor-shaped isotime caused by competing geometric variables of distance and angle.

FIG. 6 illustrates the effects of two changes from the arrangement illustrated in FIG. 5. First, n was changed from 3 to 6, resulting in a sharper off-axis fall-off. The sharper fall-off is evident by the smaller region of detection off of the optical axis. Secondly, the sample rate was decreased from 1 MHz to 200 KHz. The reduced sample rate is evidenced by the widening of the isotime. Reducing the sample rate results in reducing the spatial resolution of the isotimes. FIG. 7 shows the effects of increasing the rate of rise of the intensity of the source. The isotime position is unchanged by the change in source intensity. FIG. 8 illustrates still another effect. Again this is a two-detector system; however, each detector 10 is oriented at 90° with respect to the other. The result is a more complicated isotime, shaped like an anchor. Again the white region and the isotime defines the region of overlap where both detectors 10 detect the source. In this case, however, the isotime divides the overlap region into four sub-regions. The reason for this is the competing influences of the two geometric variables, $\rho$ and $\gamma$. The two larger white regions correspond to first detection by the detector 10 that is physically closest to the white region. The two smaller white regions correspond to first detection by the detector 10 that is diametrically opposed. In this detector arrangement, detection by one detector 10 before the other indicates the source is in either of two regions.

Figure 9:
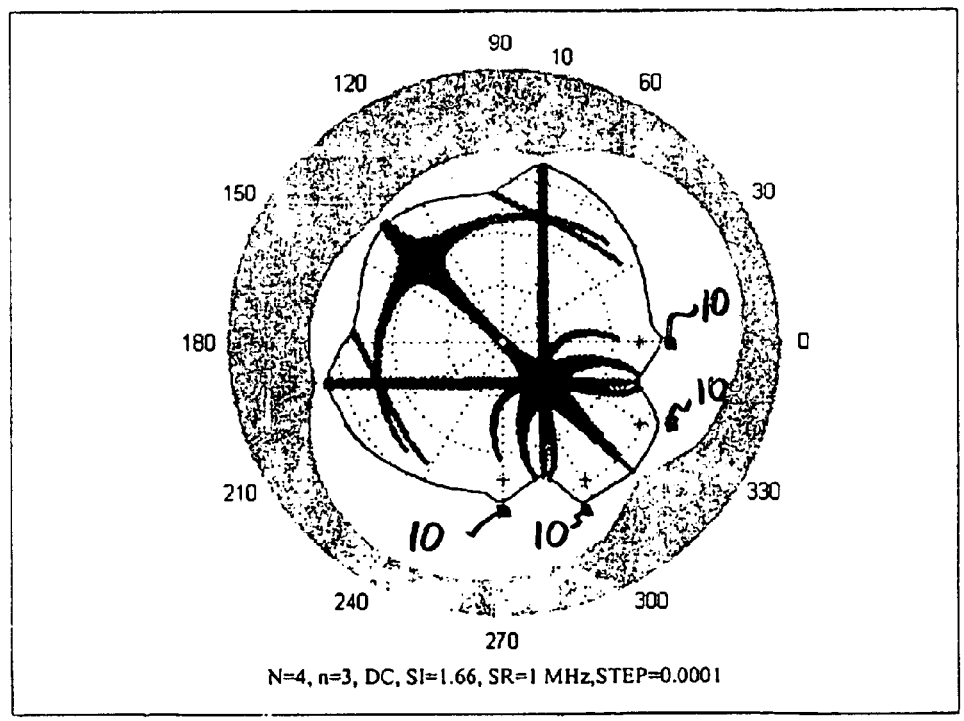
FIG. 9 is a polar diagram showing the overlapping FOV of four detectors according to the present invention, showing additional isotime complexity.
Figure 10:
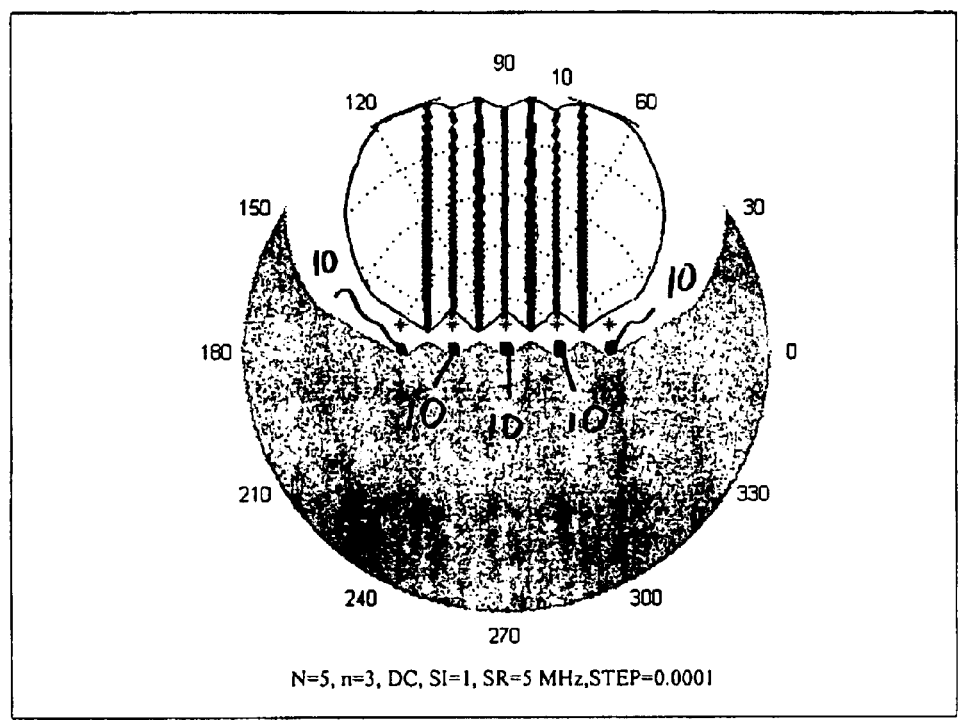
FIG. 10 is a polar diagram showing the overlapping FOV of five detectors according to the present invention arranged in a linear array, showing vertical isotimes.

FIG. 9 is a more complex arrangement created by adding two more detectors 10 to the arrangement in FIG. 8. This is a four-detector system. The complex arrangement of isotimes further partitions the detection space.

When the number of detectors 10 is increased, the temporal ordering of the response from several detectors 10 contains additional information that further localizes the source, although it does not determine a unique latency vector. For N detectors 10, each pair generates an isotime provided that their FOVs overlap. This results in a maximum of $N*(N-1)/2$ isotimes. In some cases, the FOVs of detector pairs do not overlap, causing the number of isotimes for the system to be lower. In other arrangements, isotimes overlap causing the total number to be less than the maximal value. An example of this is a simple equally spaced 5-detector linear arrangement shown in FIG. 10, along with the isotimes. For N equally spaced identical detectors 10 oriented in parallel, there are 2N-3 isotimes that divide the space into 2N-2 regions. A source placed in a particular region of the space will generate a unique temporal detection sequence. The isotimes partition the space into regions that correspond to a particular temporal sequence of detection. Further localization is possible if some detectors 10 cannot detect the source due to FOV limitations. For example, a source located directly in front of the leftmost detector 10 will only be seen by that detector 10 and that will imply the location of the source.

Mathematical Solution for Determining the Location and Intensity of an Energy Pulse in 3-D Space Using an AC Coupled System The following analysis assumes that a system of detectors 10 is AC coupled. The latency function is different depending on whether the signal from the transducer 14 is coupled through a resistive or a capacitative element. A resistively coupled detector 10 is referred to as direct current coupled (DC). A capacitatively coupled detector 10 is referred to as alternating current (AC) coupled. In DC coupling, the threshold circuit 18 triggers when the incident light intensity exceeds a preset level. In AC coupling, the rate of rise of the incident light intensity must exceed a preset level in order to trigger the threshold circuit 18.

In certain applications, a significant advantage of AC coupling is the fact that intense but constant energy sources, such as the sun, do not trigger the threshold circuit 18. Further, since an AC-coupled detector 10 has no significant interference sources, the gain in the electronics may be set much higher. This effectively reduces the detection threshold and the latency for all pulse locations.

Recall that the total system latency ($\tau_B$) is the sum of four latency effects: (1) the time required for a signal to reach a detector 10 ($\tau_L$), (2) the time required for the signal to reach an intensity that is sufficient to trigger the threshold circuit 18 of a detector 10, termed the geometrical latency ($\tau_X$), (3) the time required for the signal to propagate through a detector 10 ($\tau_{EB}$) and (4) the time for a detector output signal to be transmitted to the rest of the system ($\tau_T$). This is shown in equation (3).

$$\tau_B = \tau_L + \tau_X + \tau_{EB} + \tau_T \tag{3}$$

The geometrical latency ($\tau_X$) is caused by two effects: (1) the distance of the pulse from the energy coupler 12 and, in the case of optical systems, (2) the off-axis attenuation due to the numerical aperture of the coupler and the cosine projection factor. Because the other latency terms are much shorter (generally on the order of nanoseconds), the geometrical latency term dominates the total system latency ($\tau_B$).

Figure 11:
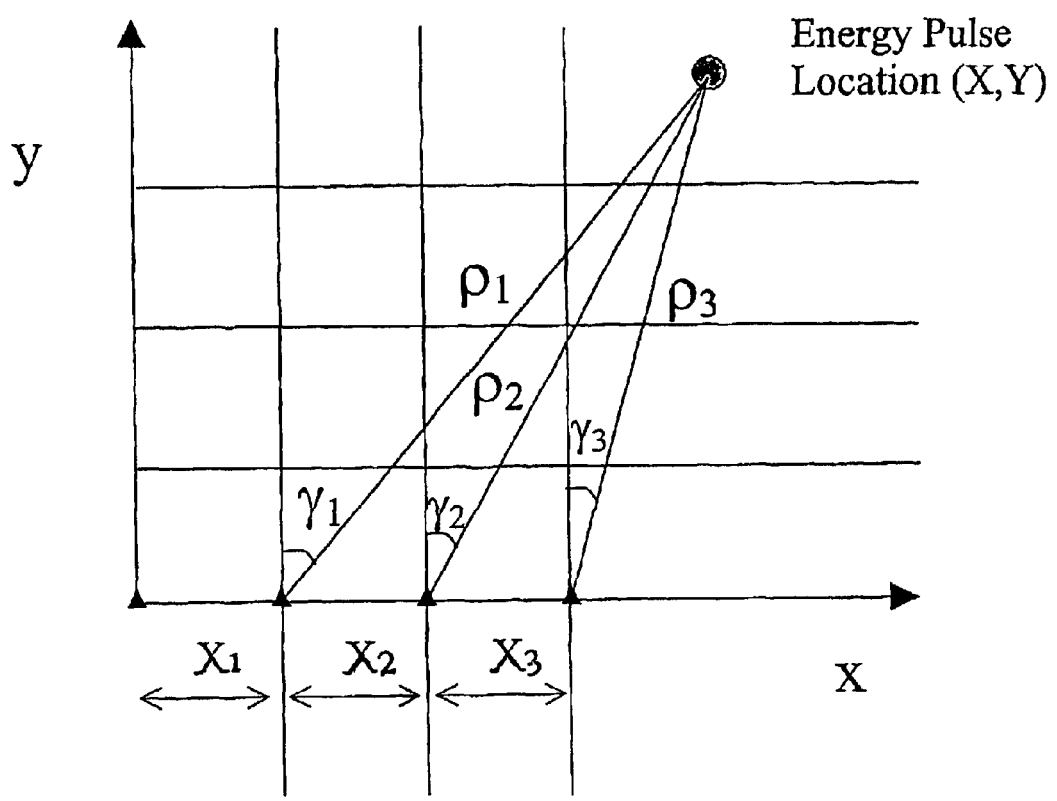
FIG. 11 is a plot showing a generic co-linear four-channel measurement system according to the present invention.

Now consider a generic co-linear four-channel measurement system in 2-D space as shown in FIG. 11. Three detectors 10 are positioned on the X-axis at $X_1$, $X_2$ and $X_3$ with normal fields-of-view in the Y direction. Also, a reference detector is positioned at the origin. Assume an energy pulse occurs anywhere within the fields-of-view of all three detectors $X_1$, $X_2$ and $X_3$ in the X-Y plane.

Figure 12:
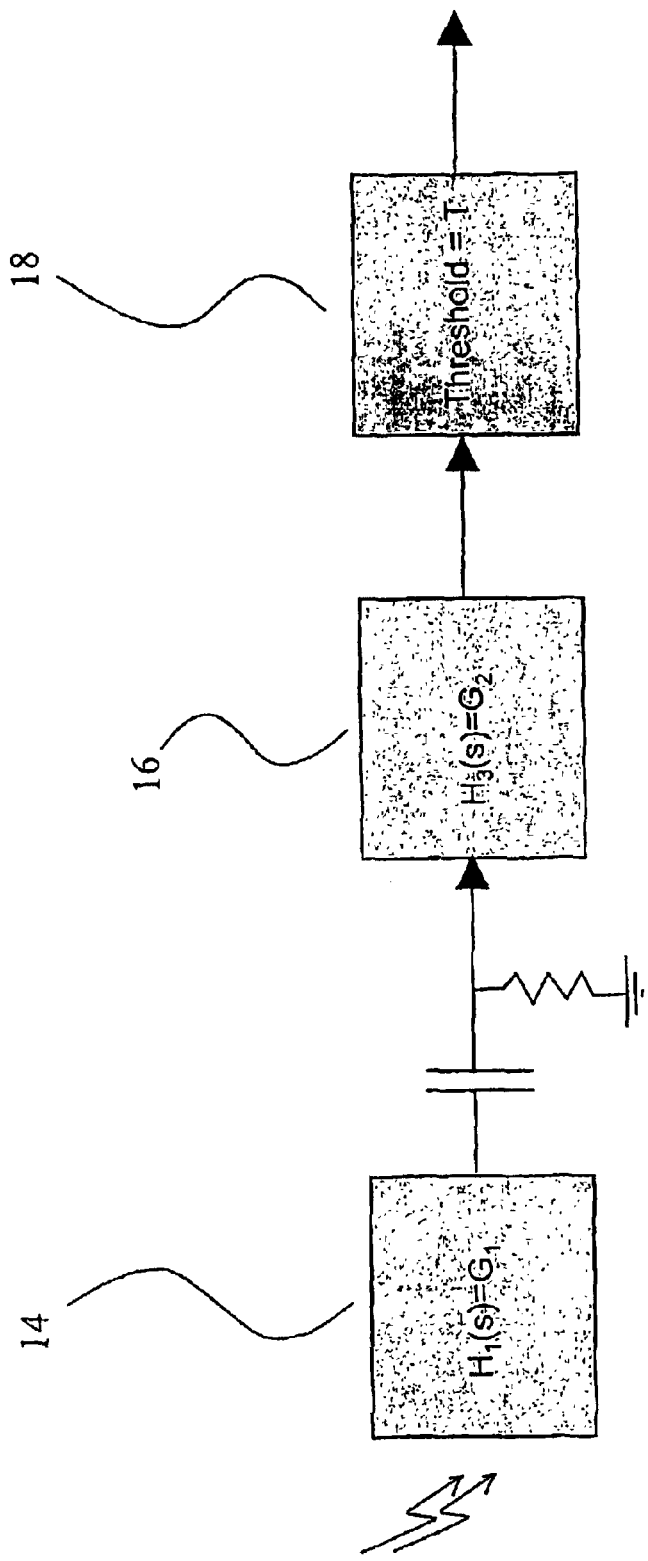
FIG. 12 is a schematic diagram showing a single-channel, AC coupled detector according to the present invention.

The first-order single-channel latency solution is derived based on the block diagram in FIG. 12. This latency expression is then applied to each of the three channels in the measurement system on the X-axis at $X_1$, $X_2$ and $X_3$. The resulting solution yields expressions for the energy pulse position and intensity based on the response times from the three channels. The initiation time of the pulse can also be resolved by the iterative procedure described later. The first-order solution is based on a linearly ramping optical input signal that originates from a point source. Using Laplace transforms, the output as a function of the complex variable s is the product of the input function and the three transfer functions associated with the three stages shown in FIG. 12.

$$V_o(s) = H_1(s)H_2(s)H_3(s)V_i(s) \tag{4}$$

The energy pulse output is modeled as a ramp during the beginning of the pulse, where A is the rate of rise of the transducer 14 current (A/s), and RC is the time constant associated with the AC coupling:

$$V_i(s) = A/s^2 \tag{5}$$

$$V_o(s) = (AG_1G_2RC)/s(1+sRC) \tag{6}$$

$$V_o(t) = AG_1G_2RC(1-e^{-t/RC}), \; t \geq 0 \tag{7}$$

Rearranging terms to solve for the geometrical latency ($\tau_X$) when the output voltage reaches a threshold T:

$$\tau_X = RC\ln(AG_1G_2RC/(AG_1G_2RC-T)) \tag{8}$$

But the rate of rise of transducer current A is related to the energy pulse intensity I by the efficiency of coupling into the transducer 14, which is comprised of several terms as shown in equation (9). $A_f$ is a function of the gain of the energy coupler (e.g., the cross-sectional area of an optical fiber), $\rho$ is again the distance from the pulse to the aperture of the energy coupler 12, $\epsilon$ is the efficiency of coupling energy from the energy coupler 12 into the transducer 14, $F(\gamma)$ is the off-axis fall-off response of the energy coupler 12 due to a cosine projection factor and losses, and $R_p$ is the transducer responsivity which is the efficiency of converting the pulse energy to current.

$$A = I(A_f/4\pi\rho^2)\epsilon F(\gamma)R_p \; \ldots \; \text{I is the energy pulse intensity (W/s)} \tag{9}$$

Defining the system parameter as shown in equation (10), the final single-channel latency solution is shown in equation (11). The system parameter includes all relevant design parameters for a system.

$$S = A_f \epsilon R_p G_1 G_2 RC/4\pi T \; \ldots \; \text{System Composite Gain} \tag{10}$$

$$\tau_X = RC\ln(1 - S^{-1}I^{-1}\rho_f^2 F^{-1}(\gamma))^{-1} \tag{11}$$

Equation (11) is now restated for channel i (i=1,2,3).

$$\tau_i = RC\ln(1 - S_i^{-1}I^{-1}\rho_i^2 F^{-1}(\gamma_i))^{-1} \tag{12}$$

For an energy pulse of unknown location within the field-of-view of each detector 10, equation (12) is a system of 3 equations (i=1,2,3) and three unknowns (X,Y,I).

To attain a closed form analytical solution, it is necessary to postulate a reasonable fall-off function for the energy coupler 12. A very reasonable and liberal form is provided in equation (13), with reference to the geometry of FIG. 11.

$$F^{-1}(\gamma_i) = \cos^{-n}(\gamma_i) = (\rho_i/y)^n \tag{13}$$

Upon substitution into equation (9), this yields:

$$\tau_i = RC\ln(1 - S_i^{-1}I^{-1}\rho_i^{n+2}y^{-n})^{-1} \tag{14}$$

Equation (14) can be rearranged into equation (15):

$$I^{(2/(n+2))} = K_i \rho_u^2 y^{(-2n/(n+2))} \tag{15}$$

where $K_i$ is expressed as in equation (16).

$$K_i = \left(\frac{S_i^{-1}}{(1-e^{-\tau_i/RC})}\right)^{(2/(n+2))} \tag{16}$$

But for a given pulse, equation (15) gives rise to equations (17) and (18) since the intensity I for a given pulse is a constant.

$$K_1\rho_1^2 = K_2\rho_2^2 \tag{17}$$

$$K_1\rho_1^2 = K_3\rho_3^2 \tag{18}$$

From FIG. 11, we can write the following expression (for i=1,2,3).

$$\rho_i^2 = (X-X_u)^2 + Y^2 \tag{19}$$

Substitution into (17) and (18) yields:

$$K_1((X-X_1)^2+Y^2) = K_2((X-X_2)^2+Y^2) \tag{20}$$

$$K_1((X-X_1)^2+Y^2) = K_3((X-X_3)^2+Y^2) \tag{21}$$

Solving equation (21) for $Y^2$ yields:

$$Y^2 = \left( \frac{K_3(X - X_3)^2 - K_1(X - X_1)^2}{(K_1 - K_3)} \right) \quad (22)$$

Substitution into (20) yields an expression of the form:

$$AX^2 + BXg + C = 0 \quad (23)$$

And reduction shows that:

$$A = 0 \quad (24)$$

$$B = 2X_1 K_1(K_3 - K_2) + 1X_2 K_2(K_1 - K_3) + 2X_3 K_3(K_2 - K_1) \quad (25)$$

$$C = X_1^2 K_1(K_2 - K_3) - X_2^2 K_2(K_1 - K_3) + X_3^2 K_3(_1 - K_2) \quad (26)$$

After which the pulse X position can be expressed in terms of the $K_i$ values and the detector positions $X_i$.

$$X = \left( \frac{X_1^2 K_1(K_3 - K_2) + X_2^2 K_2(K_1 - K_3) + X_3^2 K_3(K_2 - K_1)}{2X_1 K_1(K_3 - K_2) + 2X_2 K_2(K_1 - K_3) + 2X_3 K_3(K_2 - K_1)} \right) \quad (27)$$

Then the pulse Y position can be computed from equation (22):

$$Y = \sqrt{\frac{K_3(X - X_3)^2 - K_1(X - X_1)^2}{K_1 - K_3}} \quad (28)$$

and the energy pulse intensity I can be computed from equation (15) raised to the (n+2)/2 power. Measurements from either sensor can be used (i=1,2,3).

$$I = \left( \frac{S_i^{-1}}{(1 - e^{-\tau_i/RC})} \right) [(X - X_i)^2 + Y^2]^{(n+2)/2} Y^{-n}, \; i = 1, 2, 3 \quad (29)$$

Equations (27) through (29) represent the closed form solution for a system according to the present invention in 2-D space, assuming a ramp signal input generated by a point source and optical fall-off functions of the form $\cos^n(\gamma)$.

To use these equations, it is also necessary to have a way to measure or compute the energy Pulse Initiation Time (PIT) since the latencies for each sensor are referenced to the PIT. The measure of the PIT can be accomplished by using one detector 10 with a higher S value (e.g., the detector 10 positioned at the origin in FIG. 11), referred to as the reference detector, in each detection group. The easiest way to do this is by using one energy coupler 12 that has a much larger cross-sectional area. Due to the higher throughput of the reference channel, it will always respond first. The latency on this detector 10 can be initially assumed to be zero and the equations computed to find the pulse position and intensity (first iteration). Then in a second iteration, the latency of the reference channel can be computed and added in to the other channels and the pulse position and intensity can be resolved.

This process can be repeated to whatever resolution is required but it usually converges in three or four iterations for reasonable S values. The greater the S value difference between the normal detectors 10 and the reference detector 10 in a group, the less iteration is required.

Also evident from the energy pulse position and intensity solution is the existence of degenerate cases. For example, if $K_1$ equals $K_3$, there is no solution for Y per equation (28). This simply means that the Y computation must use measurements from detectors 10 numbered 2 and 3 in FIG. 11 rather than from 1 and 3. Although it is possible to have the K values of two detectors 10 to be equal, all three can never be equal due to the differing fields-of-view. In the degenerative case where $K_1$ equals $K_3$, the expression for Y in equation (30) may be used.

$$Y = \sqrt{\frac{K_2(X - X_2)^2 - K_1(X - X_1)^2}{K_1 - K_2}} \quad (30)$$

The preceding two-dimensional (2-D) analytical solution demonstrates the feasibility of computing an energy pulse position, intensity, and initiation time based on measurement of the multi-detector latency vector. The derivation demonstrates that the intensity effects and the position effects can effectively be separated under the enclosed assumptions. Extrapolating these equations for use in three-dimensional (3-D) space is within the skill of one of ordinary skill in the art. As discussed, such a 3-D solution requires at least five detectors 10. One possible arrangement of such detectors 10 to achieve the necessary overlapping 3-D FOV's includes a reference detector that has a significantly higher gain (i.e., higher S value) FOV than the other four FOV's. In order to monitor a larger spatial region than that defined by the overlapping FOV's of the five detectors 10, more detectors can be used, the requirement being that the FOV's of at least five detectors, including the reference, overlap at each possible location of the energy pulse. Thus a network of detectors may monitor a region of any size and shape.

Finally, for many applications, the above analytical solutions may not provide exact solutions due to various systematic errors that would be caused by deviations from ideal conditions. Such deviations include: (1) non-point sources; (2) non-linearities in the rising edge of an energy pulse; (3) non-homogeneous spatial distribution of energy from the source; (4) channel-to-channel deviations in the "real world" energy couplers 12 and other detector elements; and (5) deviations exhibited by "real world" energy couplers 12 from a pure cosine fall-off. Calibrating each detector within a system can compensate for some of these errors. In summary, for most applications, analytical solutions would likely be a good starting point for the solution. Numerical methods would then be needed to find the optimal solution. Such numerical solutions may be calculated using, for example, Newton's method, the method of steepest descent, the simplex method, or a simple grid and search algorithm. The grid and search approach appears to be the most effective and flexible. The determination of such numerical solutions is within the skill of one of ordinary skill in the art.

In summary, the present invention provides for a method and apparatus for detecting the position, intensity, and initiation time of an energy pulse in 3-D space. The method and apparatus may detect signals at very high speeds and may employ commercial-off-the-shelf (COTS) components that are inexpensive and durable. Futhermore, different embodiments of the present invention are adaptable to numerous and diverse applications, including the detection of various types of energy such as light and sound. While the above description contains many specifics, the reader should not construe these as limitations on the scope of the invention, but merely as examples of specific embodiments thereof. Those skilled in the art will envision many other possible variations and applications that are within its scope. Accordingly, the reader is requested to determine the scope of the invention by the appended claims and their legal equivalents, and not by the specific embodiments described above.

What is claimed is:

1. An energy pulse detection system comprising:
   a plurality of energy couplers for receiving signals from an energy pulse, each of said energy couplers having a defined field of view, the field of views of at least some of said energy couplers being overlapping;
   a transducer operatively connected to said energy couplers for converting a signal received from the energy pulse to a voltage or current output signal;
   an amplifier operatively connected to said transducer for amplifying the output signal from said transducer;
   a threshold circuit operatively connected to said amplifier for outputting a signal when the amplitude of the output signal from the transducer exceeds a predetermined level; and
   signal processing instrumentation, operatively connected to said threshold circuit, for calculating a source location and/or an intensity and/or an initiation time of the energy pulse,
   wherein an energy collecting efficiency of at least one of said plurality of energy couplers depends upon an orientation of said one energy coupler relative to the source location of the energy pulse, and
   wherein the source location and/or the intensity of the energy pulse is calculated based on a temporal ordering of signals output from said threshold circuit corresponding to different directional energy couplers.

2. An energy pulse detection system according to claim 1, further comprising:
   a plurality of transducers, a plurality of amplifiers, and a plurality of threshold circuits, each respectively and operatively connected to one of said energy couplers.

3. An energy pulse detection system according to claim 1, wherein said energy couplers are selected from the group consisting of: optical lenses, fiber optic cables, sound tubes, directional microphones, and directional antennas.

4. An energy pulse detection system according to claim 1, wherein the detection system is AC coupled.

5. An energy pulse detection system according to claim 1, wherein the detection system is DC coupled.

6. An energy pulse detection system comprising:
   a plurality of energy couplers for receiving signals from an energy pulse, each of said energy couplers having a defined field of view, the field of views of at least some of said energy couplers being overlapping;
   a transducer operatively connected to said energy couplers for converting a signal received from the energy pulse to a voltage or current output signal;
   an amplifier operatively connected to said transducer for amplifying the output signal from said transducer;
   a threshold circuit operatively connected to said amplifier for outputting a signal when the amplitude of the output signal from the transducer exceeds a predetermined level; and
   signal processing instrumentation, operatively connected to said threshold circuit, for calculating a source location and/or an intensity and/or an initiation time of the energy pulse,
   wherein an energy collecting efficiency of at least one of said plurality of energy couplers depends upon an orientation of said one energy coupler relative to the source location of the energy pulse, and
   wherein the source location and/or the intensity and/or the initiation time of the energy pulse is determined by measuring a latency vector.

7. A method for detecting the source location and/or intensity of an energy pulse, comprising:
   receiving signals from an energy pulse using a plurality of directional energy couplers pointing in different directions, the field of views of at least some of said energy couplers being overlapping;
   converting the signals received from the energy pulse to voltage or current signals;
   outputting a signal when the amplitude of a converted signal exceeds a predetermined level; and
   calculating the source location and/or the intensity and/or the initiation time of the energy pulse based on the timing of output signals corresponding to different directional energy couplers,
   wherein an energy collecting efficiency of at least one of said plurality of energy couplers depends upon an orientation of said one energy coupler relative to the source location of the energy pulse, and
   wherein said calculating includes calculating the source location and/or the intensity of the energy pulse based on a temporal ordering of signals output from said outputting step corresponding to different directional energy couplers.

8. A method for detecting the source location and/or intensity of an energy pulse according to claim 7, wherein said energy couplers are selected from the group consisting of:
   optical lenses, fiber optic cables, sound tubes, directional microphones, and directional antennas.

9. An energy pulse detection system comprising:
   a plurality of coupling means for coupling energy signals caused by an energy pulse;
   transducing means, operatively connected to said coupling means, for converting the received energy signals to voltage or current signals;
   amplifying means, operatively connected to said transducing means, for receiving and amplifying the voltage or current signals from said transducing means;
   thresholding means, operatively connected to said amplifying means, for outputting a signal when the amplitude of a received energy signal exceeds a predetermined level; and
   signal processing means, operatively connected to said thresholding means, for calculating a source location and/or an intensity and/or an initiation time of the energy pulse based on a timing of signals output from said thresholding means,
   wherein an energy collecting efficiency of at least one of said plurality of coupling means depends upon an orientation of said one energy coupling means relative to the source location of the enemy pulse, and
   wherein the source location and/or the intensity of the energy pulse is calculated based on a temporal ordering of signals output from said thresholding means corresponding to different directional enemy coupling means.

* * * * *